United States Patent [19]

Sowman et al.

[11] 4,012,474

[45] Mar. 15, 1977

[54] METHOD FOR PRODUCING BORON CARBIDE SPHERULES

[75] Inventors: Harold G. Sowman, Maplewood; James R. Johnson, White Bear Lake, both of Minn.

[73] Assignee: General Atomic Company, San Diego, Calif.

[22] Filed: Apr. 5, 1966

[21] Appl. No.: 540,197

Related U.S. Application Data

[60] Continuation-in-part of Ser. No. 295,825, July 17, 1963, abandoned, which is a division of Ser. No. 256,238, Feb. 15, 1963, Pat. No. 3,163,609, and Ser. No. 256,239, Feb. 5, 1963, abandoned, said Ser. No. 256,238, and Ser. No. 256,239, each is a division of Ser. No. 96,081, March 16, 1961, Pat. No. 3,129,188, which is a continuation-in-part of Ser. No. 838,445, Sept. 8, 1959, abandoned.

[52] U.S. Cl. .................................. 264/15; 264/82
[51] Int. Cl.² ........................................ B23C 23/00
[58] Field of Search ............................... 264/15, 82

[56] References Cited

UNITED STATES PATENTS 4,501,419  7/1924  Podszus ........................... 23/208 A Primary Examiner—Donald J. Arnold
Assistant Examiner—James R. Hall
Attorney, Agent, or Firm—Fitch, Even, Tabin & Luedeka

[57] ABSTRACT

Tiny spherules of boron carbide having a diameter in the range of about 10 microns to about 125 mils, with a smooth, substantially spherical outer surface formed from the molten state by surface tension forces, are made by melting irregular particles of boron carbide or boron compounds which react with carbon to form boron carbide in an isolating medium such as finely divided carbon or boron nitride.

4 Claims, No Drawings

METHOD FOR PRODUCING BORON CARBIDE SPHERULES

This application is a continuation-in-part of our co-pending application Ser. No. 295,825, filed July 17, 1963, now abandoned as a division of our copending application Ser. No. 256,238, filed Feb. 5, 1963, issued Dec. 29, 1964 as U.S. Pat. No. 3,163,609; and Ser. No. 256,239, filed Feb. 5, 1963, now abandoned; both of said applications Ser. Nos. 256,238 and 236,239 being divisions of application Ser. No. 96,081, filed Mar. 16, 1961, which issued as U.S. Pat. No. 3,129,188 on Apr. 14, 1964 and which was a continuation-in-part of our earlier-filed application Ser. No. 838,445, filed Sept. 8, 1959, now abandoned.

This invention relates to spherules of refractory carbides and more particularly to spherules of boron carbide and processes for the production thereof.

It is known that when it is desired to design a nuclear reactor of large size relative to the critical mass, it is necessary to provide a means of controlling the neutron flux so that the reactor is not self-destructive. Thus, it is necessary to incorporate into the reactor materials capable of absorbing and dissipating excess neutrons. It is particularly desirable to incorporate as such materials substances which become less efficient in absorption and dissipation of excess neutrons as operation of the reactor proceeds, since the accumulation of fissioned materials normally lowers the efficiency of the system progressively, until such point as a self-sustaining reaction is no longer possible. Effectively removing the neutron absorbing materials during the life of such a reactor permits longer operation of the system before chemical reprocessing of the fuel elements is required.

An especially efficient way of accomplishing the controlled but progressive effective removal of neutron absorbers from atomic reactor systems is by the use of destructible or burnable poisons in the reactor core. By the term destructible or burnable poisons is meant substances capable of absorbing neutrons, and which are thereby converted to non-absorptive atoms. For example, boron as such or in the form of boron carbide is converted to helium or lithium which are no longer effective neutron absorbers. To use boron carbide effectively for this purpose, it should be distributed relatively homogeneously in the core or that part of the core in which it is desired to burn poison and fuel simultaneously. The poison may be incorporated with the fuel or as a separate element. Particles of these substances can be incorporated in a metal shell at a desired concentration to give the effective absorption capacity desired, for example, by thorough mixing with metallic powders and following the technology of powder metallurgy to produce an intermediate compressed shape which is sintered to give a final configuration. However, the use of ordinary particles of irregular shape but of reasonably uniform individual size has been found to suffer from the disadvantage that during working of the metal further fragmentation takes place, with the production of defects which permit diffusion of the helium produced by neutron capture, or an accumulation of the gas may even result in a rupture of the metal container. Furthermore, if the metallic elements containing the burnable poison are mechanically worked in any way following their shaping by sintering, the irregular particles break up and string out, thus causing internal porosity permitting rapid transfer of fissioned gases or particles along the line of the defect. Spherical particles would greatly reduce these disadvantageous results.

It is an object of this invention to provide a process for the production of substantially spherical particles of boron carbide.

Other objects of the invention will become evident from the disclosures hereinafter made.

In accordance with the above and other objects of the invention, it has been found that solid spherules of boron carbide can be formed by rapidly melting discrete particles of a source of this substance in admixture with a resilient inert isolating material of low bulk density such as amorphous carbon, graphite, boron nitride and the like to form small molten spheres, and then cooling the mixture to solidify the carbide in spherical shape. The essential step appears to be that of maintaining the discrete, isolated particles of boron carbide in molten form for a time just sufficient to form spherules by operation of surface tension on the molten particle.

By the term "spherules" as used herein, it is intended to designate substantially spherical structures having a diameter in the range of about 10 microns up to about 125 mils, having a glossy surface formed from the molten or at least semi-molten state by the operation of surface tension, while the interior of the said spherules has a crystalline structure characteristic of the particular carbide system and is substantially free from voids. In some instances, the spherules when viewed under magnification appear to have a surface consisting of minute facets. The presence of such minute surfaces of different radius of curvature is immaterial when the particle as a whole is substantially spherical. The spherules exhibit the property of rolling on slight inclines which is characteristic of spheres.

Surprisingly, while the spherules produced in the process of the invention are crystalline as shown by X-ray diffraction studies, the surfaces of the spherules are uniformly smooth and substantially spherical, presenting a highly polished appearance when inspected under the microscope at moderate powers of magnification. The particles are furthermore solid, by which is meant that they are substantially free from voids. If particles of uniform size are used as starting materials, the resulting spherules are also of substantially uniform diameter. However, the starting material may contain a wide range of sizes, and the final product will in that case also have a wide variation in diameter. The spherules can of course be graded as to size by the use of appropriate sieves.

While it has heretofore been known to produce small beads from glass or vitreous materials, so far as is known the art has not heretofore been aware of any way in which spherules of hard crystalline substances, such as boron carbide, can be made. It is highly unexpected to find that crystalline, substantially void-free spherules of hard crystalline substances, such as boron carbide, can be made. It is highly unexpected to find that crystalline spherules of boron carbide can in fact be produced without domination of the surface by crystal faces. Aside from the fact that spherules are formed from crystalline chemical compounds as opposed to vitreous substances by the process of the invention, it is also rather surprising to find that spherules of boron carbide are formed at all when carbon is used as an isolating medium, since it has been found that molten boron carbide wets carbon surfaces and it might be expected that when fused it would interpenetrate the graphite or carbon particles employed as an isolating medium or dissolve so much carbon as to form merely a boron carbide having high carbon content. Without being bound thereby, it may be hypothesized that the formation of spherules may result from a blanketing effect of the resilient or yielding finely divided carbon or other non-reactive low bulk density isolating media employed. When coarse isolating powders are used, of the order of particle size of the material which is to be made spherical, satisfactory spherules are not usually formed.

It is found that the carbon content of boron carbide spherules commonly increases over that of the original particles on spheroidization by the process of the invention. This may be caused by solution of some of the carbon in direct contact with the molten boron carbide over a relatively larger area or along a particular crystal axis. The resulting spherules usually contain boron and carbon in a ratio of from about 3 to 6 atoms of boron per atom of carbon. It is known that boron carbides exist thus in a number of phases, including phases containing free or dissolved carbon. The phases which may be present can be determined by reference to the phase diagram of boron and carbon shown in Zhurnal fizicheskoi Khimii, Vol. 32, pp. 24–28, October, 1958.

Broadly speaking, the process of the invention is carried out by isolating small irregularly shaped discrete particles of a source of boron carbide by mixing them with an isolating medium of low bulk density, placing the mixture in a suitable furnace in the presence of a non-reactive atmosphere, rapidly heating the mixture to a temperature sufficient to form spherules owing to the surface tension forces acting on the molten or semi-molten carbide, cooling the mixture and removing the isolating material from the spherules.

The isolating medium used can be any substance not inter-reactive with the carbides, which is of low bulk density, and which is not melted at, nor otherwise physically changed, at the temperatures used in the process. Examples of such materials are carbon and boron nitride in finely divided form.

Elemental boron and various compounds of boron, such as the oxide, may be employed as equivalents of the carbide, in that they form the carbide at the temperatures used, when carbon is employed as the isolating medium or in conjunction therewith. It is possible that the reaction with carbon (carburizing) which takes place when a source other than the final carbide is used as a starting material occurs more or less simultaneously with the spheroidization, and at a lower temperature than the melting point of the carbide. Without wishing to be bound by theory, it is possible that in some cases spherules of lower melting materials, such as boric oxide, are first formed, followed by rapid reaction with the carbon to form the carbide. However, it is considered that this process is fully equivalent to the process in which the carbide actually exists in molten form.

It will be apparent that if a precursor for the boron carbide is used, such as metal oxide, it will be necessary to provide at least sufficient carbon in the isolating mixture to react with the precursor in addition to the amount of isolant necessary to effect isolation of the particles.

While reference is made herein to boron "metal," it is of course apparent that boron is not a true metal in the generally accepted sense of the word, and it is to be understood that the term "metal" in this connection is used for convenience only as designating the element.

To avoid oxidation, it is preferred to heat the mixture in a non-reactive atmosphere, meaning by the term atmospheres which do not react with any of the components of the mixture which is heated. Oxygen will of course react with the carbon and with carbides at elevated temperatures, and a substantially oxygen-free environment is therefore desirable. The chief function of the non-reactive atmosphere is thus to prevent the combustion of the carbon which would otherwise take place in the presence of oxygen at the temperature employed, but the atmosphere used must not react with the carbide source or with the isolating medium. The noble gases, i.e. argon, helium or the like, can be employed; or gases can be removed to leave a "vacuum". It is known that nitrogen may react with boron at the temperature employed in the process to form boron nitride, which may in some instances be undesirable.

When starting materials other than boron or boron carbide are used, the carbon may also react with other atoms present therein, to form gases. Carbon monoxide and/or carbon dioxide, for example, are produced when a boric oxide is the source material. In this case, provision must be made for removing these reaction products.

It is a rather surprising feature of the process that reaction to form spherules of carbides from sources other than boron carbide, e.g. the metal or oxides, proceeds so rapidly as to be virtually complete in the relatively short time intervals employed. This is particularly striking because as suggested above, reaction may be taking place with spherular particles of the precursor which then present a minimum surface for reaction.

While other finely divided isolating media may be employed, carbon powder is conveniently available and is used herein to exemplify isolating media in general as to the amounts and state of division which can be used. The carbon powder which is used need not be chemically pure carbon, but as used herein the term "carbon" is employed in the common technical sense and includes graphite, carbon black, lamp black, amorphous carbon, petroleum coke and the like low bulk density forms of carbon. Preferably, the particle size of the powdered carbon or other isolating particles which are employed is at least about one order of magnitude smaller than that of the material to be converted to spherules, so that there are a large number of carbon particles for each of the particles of carbide which is to be produced as a spherule. The effect is to provide a yielding, or resilient, supporting medium for the spherules as they form. Various forms of finely divided carbon and the particle sizes thereof are described in "Industrial Carbon," Mantell, D. Van Nostrand Co., Inc., New York, 2nd ed., 1946.

Generally speaking, the proportion of isolant to the carbide or carbide precursor which is employed in the initial mixture may be varied over a wide range in carrying out the invention. Thus, 100 parts by weight of isolant can be used for each 1 to 100 parts of starting material, although it should be understood that proportions outside of this range can also be used. While an unduly high proportion of carbon powder results in somewhat less economical operation, in that the heating of a relatively large mass of material is required before fusion of the carbide particles takes place, this does not prevent formation of spherules. On the other hand, too small a proportion of carbon prevents the mechanical separating action to the degree which is necessary to obtaining good spheres and apparently also affects the resiliency adversely. It will be apparent that when a precursor substance is used which reacts to form the boron carbide on heating with carbon, the amount of carbon is increased to compensate for the carbon which is consumed in the reaction, or an amount of carbon must be added to the reaction mixture to serve as a carbon source for the chemical reaction. Preferably, a ratio of about 5 to 20 parts of carbon by weight to 1 part by weight of carbide or carbide precursor is employed, as providing better size control for the spherules.

The spherules can be made by a batch process. In this case, after thorough mixing, to insure that the finely divided mixture of isolating medium and source of carbide is substantially homogeneous, it is placed in a suitable refractory container in a furnace, in an inert (non-reactive) atmosphere, and heated rapidly to a temperature in the range of about 2300° to 2700° C. The temperature to be employed is that which is just sufficient to melt the carbide, so that the force of surface tension can draw each particle of the carbide into a spherical shape. The melting point of boron carbide is about 2450° C. Although temperatures somewhat in excess of this temperature can be employed, they are not necessary for successful formation of the spherules and may result in some coalescing of the spherules to form larger spherules. While this may not be undesirable in some instances, it will be apparent that control of the diameter of the spherules will then be more difficult.

Temperatures of the order required in the process, i.e. above about 2000° C., are determined optically and therefore are not exact temperatures. Some variation in observed temperature from batch to batch may consequently be expected, as well as differences arising from personal visual errors.

The heating of the mixture is continued only for so long as is necessary to produce substantially void-free spherules. The dwell time in the furnace, i.e. the length of time required to form spherules, is readily determined by empirical methods and depends on the mass of material being heated and the capacity of the furnace. The mass is kept in the furnace just slightly longer than requires for the entire mass to reach the melting point of the carbide, which is just sufficient to bring about transformation of the carbide particles to spherules. The mixture is then rapidly cooled to a temperature below the melting point of the boron carbide, for example, by removal of the mixture, while maintaining the non-reactive atmosphere, to a zone in which positive cooling is accomplished. After cooling, the spherules are separated from the remainder of the mixture, for example, by washing, screening, flotation techniques and the like.

Alternatively, a rotary kiln may be used for continuous larger volume commercial production. In this case, the mixture of isolant and starting materials is fed continuously into the upper end of a rotary kiln which slopes downwardly from inlet to outlet. The inlet end of the kiln is heated by any convenient means to a temperature in the appropriate range and as the mixture progresses it rapidly becomes heated to cause formation of spherules. A non-reactive atmosphere is provided in the kiln. The kiln may be provided with a positively cooled zone, or the mixture may be discharged into a stream of cold inert gas and allowed to fall into a receptacle. The slope of the kiln is adjusted to provide the proper dwell time for the temperature and heating unit employed. The use of a rotary kiln is less desirable since larger spherules are formed by agglomeration and size control is therefore more difficult.

In another method which can be used for making the spherules of the invention, a bed of the selected isolating medium is spread upon a refractory pallet, such as a graphite block of appropriate dimensions. The isolating medium can be present in a relatively thin layer, as for example about 10 to 100 mils in thickness. The finely divided boron carbide is then sprinkled on this bed in a layer approximately one particle thick, and subjected to intense heat in a non-reactive atmosphere until the carbide particles are drawn into spherules. The pallet is thereupon removed from the heating zone and cooled.

It is commonly found that the isolating medium to some extent adheres to the surfaces of the spherules, particularly when caarbon is employed. Preferably, the spherules are treated with a liquid bath containing a detergent, to remove the carbon or other materials as completely as possible from their surfaces. However, where carbon is used, it will be apparent that for some applications it will not be necessary to remove the adherent carbon as completely as for others. If desired, substantially all of the carbon which may be adherent to, or which may form a skin on or as part of the surface can be removed therefrom by oxidation under controlled conditions, as for example, by refluxing the particles with chromic acid solution, or by heating them in air at about 1000° C. Mechanically milling in a ball mill with an organic solvent such as acetone, and with rubber-covered steel balls, removes the adherent material.

Cleaning of the spherules of the invention is also usefully accomplished by employing ultrasonic vibrating devices. The process comprises suspending the spherules in an inert liquid having a viscosity no greater than that of water, preferably containing a small amount of surfactant, and subjecting the suspension to ultrasonic vibrations for about 3 to 5 minutes. The liquid is decanted and replaced with fresh liquid repeatedly until suspended carbon is no longer evident therein.

Boron carbide spherules made by the process of the invention are substantially void-free. They are much stronger than angular particles obtained by crushing masses of boron carbide, or rounded particles produced by processing involving abrasion.

Having thus described the invention in broad general terms it is now more specifically illustrated by examples which show the best mode contemplated of practicing the invention. In these examples all parts are by weight unless otherwise specified.

EXAMPLE 1

A mixture of powdered boron carbide and graphite is prepared by mixing 6.75 parts of boron carbide of −140 to +325 mesh and 33.75 parts of finely divided carbon (a furnace black or "Thermatomic" carbon) in a one pint glass jar in which are placed coiled iron wires. Mixing is effected by rolling the jar on rollers of the type used for laboratory ball mills for 10 minutes at about 112 rpm. The mixture is separated from the wires avoiding manipulation which might cause separation of the solid ingredients and the mixture is packed loosely in a carbon tube of suitable size loosely fitted at both ends with threaded graphite plugs. This is referred to as a boat.

The boat containing the batch is placed at the entrance of a carbon tube furnace about 3 feet long and 3 inches in diameter approximately the central one-third portion of which is heated to a temperature of 2500° C. by passage of an electric current therethrough (resistance heating). Temperatures are determined optically. The furnace is flushed with argon to provide a non-oxidizing atmosphere and to prevent oxidation of the carbon tube. Enough of the argon enters the boat to leave an inert atmosphere in the boat without special measures. After the boat has attained a bright red heat (about 700° C.) at the front of the furnace (about 2–3 minutes) it is moved into the central region of the furnace, held at 2500° C. and left there for about 8 minutes. When first moved to this region there is a drop in temperature of the furnace, which is quickly restored and the boat attains the said temperature in about 3–5 minutes. The actual time required depends on the particular dimensions of the system. The slightly longer residence time of 8 minutes permits the boron carbide to melt and form molten spherules in the graphite matrix. The boat is then moved to the water cooled cold end of the furnace and permitted to cool rapidly to below a red heat (about 600° C.). This requires about 5 minutes. The boat is then removed from the furnace and one plug removed.

When cooled sufficiently that the batch inside no longer appears to glow, the batch is poured into a large volume of dilute solution of a detergent such as an alkyl ether of polyethylene glycol (available commerically under the Trade Mark "Tergitol." The suspension is stirred to permit wetting of the particles of carbon and spherules of boron carbide and poured through a 325 mesh wire screen. The residue is washed repeatedly with clear water and fresh detergent solution until the wash water no longer shows observable discoloration due to carbon. The batch is then dried and found to weigh slightly more than the boron carbide used, owing to pickup of carbon in the spherules partly as free occluded carbon and partly as carbon dissolved in the boron carbide. The spherules vary in diameter from about 50 to 200 microns, and are separated from a few percent of malformed particles by rolling down an inclined plane or other method. Screening serves to classify the spherules in various diameters if desired. Analysis for boron and carbon shows:

| Total | H | 67.74 percent |
|-------|---|---------------|
| Total | C | 34.23 percent |
| Free  | C | 12.09 percent |

The values for total B and C are presumably both slightly high. The atomic ratio for boron to combined carbon is about 3.4:1 to about 3.5:1. The spherules show the characteristic X-ray diffraction patterns of boron carbide. These spherules are hard and smooth and are suited for incorporation in reactor designs as a burnable poison. Reference to the above-cited phase diagram shows that this composition (24.6 percent C combined) corresponds to the $\beta'$ phase.

EXAMPLE 2

When the preceding procedure is repeated, except that boron is used instead of the boron carbide, operating at a furnace temperature of about 2350° C. to about 2500° C., spherules of boron carbide are obtained. When the boron used as a starting material is of particle size −140 to +325 mesh, the spherules obtained are approximately 40 to 200 microns in diameter.

EXAMPLE 3

The procedure of Example 1 is repeated, except that boron-rich boron carbide, corresponding to $B_{4.5}C$ and having a particle size of about −100 to +400 mesh, is employed. A furnace temperature of about 2500° C. is used. Spherules of boron carbide, having the formula $B_{3.4\text{-}3.5}C$ and about 37 to 150 microns in diameter, are obtained.

This procedure is repeated, except that boron-rich boron carbide corresponding to the formula $B_6C$ and having a particle size of −100 to +400 mesh is employed. The temperature used is the same as that used for the $B_{4.5}C$ particles.

Spherules of boron carbide corresponding to the approximate formula $B_{3.4}C\text{-}B_{3.5}C$, and having a diameter ranging from about 37 to 150 microns, are thus obtained.

EXAMPLE 4

The procedure of Example 1 is repeated, except that 7 parts of powdered boric acid are used. The furnace temperature employed is about 2500° C. The dwell time in the furnace is about 10 minutes at furnace temperature. The gaseous products of reaction escape from the boat through the loose plugs; when large batches are made, the initial heat-up time is lengthened to prevent disruption of the boat by a too-rapid reaction. Spherules of boron carbide, as shown by characteristic X-ray diffraction patterns, are obtained, having a range of diameters of 10 microns up to about 200 microns. The smaller spherules, having diameters ranging from about 10 to 30 microns, can be separated from the carbon in the wash water by sedimentation and decantation.

Substantially the same results are obtained when 7 parts of −100 mesh boric oxide ($B_2O_3$) are substituted for the boric acid which is employed above. In this case, a furnace temperature of about 2450° C. is used, and spherules of boron carbide having a diameter range of from about 50 to 200 microns are obtained. The spherules are shown to be boron carbide by their characteristic X-ray diffraction patterns.

EXAMPLE 5

The procedure of Example 1 is repeated, except that 13.5 parts of carbon are used. Spherules of boron carbide having an approximate diameter ranging from 50 microns to 200 microns are obtained, while an amount of the boron carbide agglomerates to larger diameters. Similarly, when the procedure of Example 1 is repeated, except that 67.5 parts of carbon are used, spherules having the same diameter range are obtained. The use of 337.5 parts of carbon for isolating 6.75 parts of boron carbide likewise gives useful spherules, but the heating of this large mass of low bulk density requires an increase in dwell time in the furnace and the separation of the spherules from the carbon becomes somewhat more difficult. These changes in the proportions of carbon employed does not substantially affect the amount of carbon which is found upon the surfaces of the spherules, or that which is found to be dissolved in the spherules, because there is always a large excess of carbon available to the particulate material.

EXAMPLE 6

A larger batch of spherular crystalline boron carbide is prepared in a series of smaller batches as follows: Powdered boron carbide of the approximate formula $B_4C$ consisting of about 30 percent by weight of discrete particles of less than 100 mesh and more than 200 mesh and the balance of discrete particles between 200 and 270 mesh is carefully blended with 10 parts by weight of finely divided carbon (furnace black, available under the Trade Mark "Thermax") in a twin-shell blender with an intensifier bar for five minutes. Portions of the blended mixture weighing approximately 110 grams are placed in cylindrical graphite boats 11 inches long and 4 inches outside diameter with ⅛ inch thick walls and the boats are then successively placed in a tube furnace in a flowing argon atmosphere at 2500° C. for 10 minutes and then moved forward to a cooling zone to cool to around 600° C. Thereafter, the mixture is cooled to a convenient handling temperature and the contents of the several boats are screened to remove carbon as above by washing with water containing a wetting agent and dried. Rough classification to remove substantially non-spherular particles provides 113 grams of substantially spherical crystalline boron carbide. Sieve analysis shows that about half of the material is in the range of about 35 to 50 microns in diameter mesh and most of the rest is in the range of about 50 to 150 microns in diameter. Some of the spherules fail to pass a 70 mesh screen and approach 125 mils in diameter. The finer material contains an excess of carbon, probably to some extent unremoved isolating carbon.

EXAMPLE 7

Ten parts of boron nitride of −325 mesh size (substantially all of the particles being about 10 microns in diameter) and 1 part of boron carbide ($B_4C$) of about −100 to +270 mesh size are carefully mixed to insure that the boron carbide particles are uniformly distributed throughout the mixture. The mixture is then loosely packed into a graphite boat which is approximately 2¾ inches in diameter and 7 inches long, and with wall thickness of about ¼ inches. The ends are loosely plugged with graphite discs. The boat is placed in the entrance of a carbon tube furnace as described in Example 1. The furnace is flushed with argon and the argon atmosphere is maintained throughout the heating and cooling operations. After the boat has attained a bright red heat, it is moved to the 2500° C. zone of the furnace and held there for about 8 minutes. At this time the entire mass has become heated to a temperature sufficient to melt the boron carbide particles and form spherules. The boat is then moved to the water-cooled cold end of the furnace and permitted to cool rapidly. When it is no longer at red heat, it is removed from the furnace and cooled until it can be handled conveniently. The boat is opened and the spherules which are formed are separated by washing the boron nitride from the spherules, using copious quantities of a dilute aqueous detergent solution, followed with distilled water.

Spherules of $B_4C$ ranging in diameter from about 60 to 150 microns are thus obtained.

For certain nuclear reactor uses it is desirable that the spherules of boron carbide be sheathed with a tough cladding which is substantially impervious to fission products and yet non-absorptive of neutrons. Such coatings can be provided by plating the spherules with metals, by coating with appropriate ceramic powders together with a binder followed by firing, by decomposition of gases to deposit hard carbon on the spherules, or the like.

It is found that a particularly useful coating is provided by a layer of carbon deposited by pyrolysis of a hydrocarbon. Since the layer of pyrolytic carbon thus produced shows properties different from those of graphite or ordinary soft carbon, it is convenient to refer to it by a distinctive term and it is herein termed pyrocarbon.

It is found that pyrocarbon is deposited on the spherules as a tough coating by the pyrolysis of methane, acetylene, carbon monoxide or the like at a temperature of about 1300° C. to 1700° C. or even higher. While some deposition of pyrocarbon occurs on static spherules, the preferred procedure is to maintain the spherules in motion to achieve a more uniform coating on each spherule. This is achieved by slowly dropping the spherules through a heated zone, by vibrating a suitable receptacle containing the spherules in a heated zone, by tumbling the spherules by rotation of the heated zone, or by fluidizing a bed of the spherules using an inert gas, for example, helium, at the temperatures noted above. The hydrocarbon or other gas to be pyrolyzed is conveyed into the heated zone to contact the particles. Usually an inert diluent gas is used, e.g. argon, to reduce the concentration of gas to be pyrolyzed to about 10 percent/vol. or less. A tough, pyrocarbon coating, of thickness depending on the duration of exposure, is formed on each spherule.

What is claimed is:

1. The method for producing solid spherules of a crystalline boron carbide which comprises the transformation to spherical shape of small irregularly shaped discrete particles of a material of the group consisting of boron carbide and compounds of boron which react with carbon on heating to form boron carbide, said discrete particles being isolated from one another by an isolating medium characterized by low bulk density, resiliency, lack of undesirable reactivity and, when said small irregularly shaped particles are other than boron carbide, by the presence of at least a sufficient amount of carbon to produce boron carbide in addition to the isolating medium, by subjecting said particles in the isolating medium to rapid heating in a non-reactive atmosphere for a sufficient time and at a sufficient intensity to effect formation of boron carbide by reaction with carbon when the particles are other than a carbide and to bring about fusion of the discrete small particles in the isolating medium thereby subjecting said discrete molten particles to the action of surface tension forces inherent in said molten particles and rendering them substantially spherical, and cooling the resultant discrete spherular particles to solidify them.

2. The method according to claim 1, in which the isolating medium is finely divided boron nitride.

3. The method according to claim 1, in which the isolating medium is finely divided carbon.

4. A method according to claim 1, in which the spherular particles after cooling to solidify them are heated in a gaseous hydrocarbon atmosphere to above the pyrolytic decomposition temperature for said hydrocarbon to form a protective adherent outer coating of pyrolytic carbon about said particles.

* * * * *

UNITED STATES PATENT AND TRADEMARK OFFICE
CERTIFICATE OF CORRECTION

PATENT NO. : 4,012,474
DATED : March 15, 1977
INVENTOR(S) : Sowman, et al.

It is certified that error appears in the above—identified patent and that said Letters Patent are hereby corrected as shown below:

Column 6, line 21    "caarbon" should be --carbon--.

Column 7, line 55    "H" should be --B--.

Column 7, line 60    "for" should be --of--.

Signed and Sealed this twenty-sixth Day of July 1977

[SEAL]

Attest:

RUTH C. MASON
*Attesting Officer*

C. MARSHALL DANN
*Commissioner of Patents and Trademarks*